Patented Dec. 24, 1940

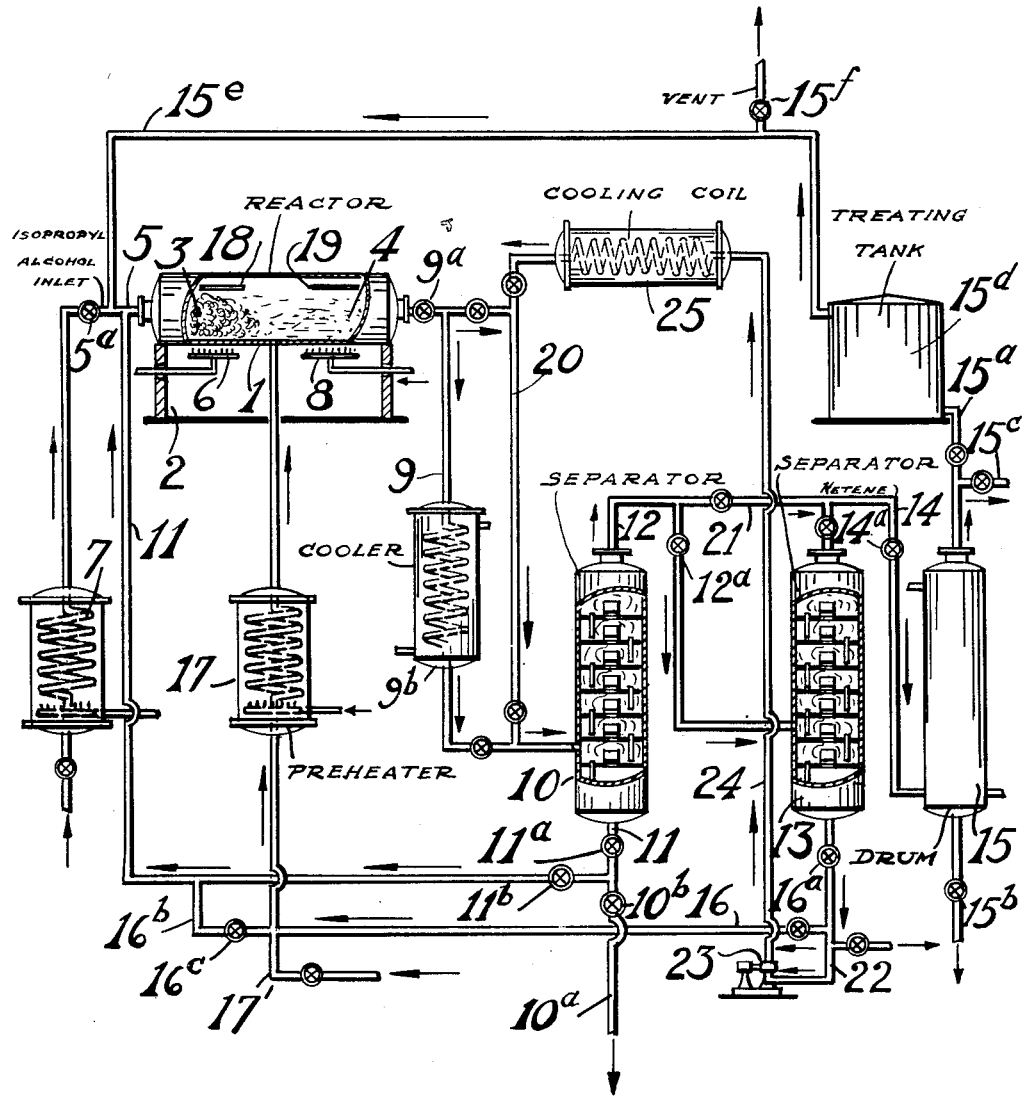

2,225,944

UNITED STATES PATENT OFFICE 2,225,944

PROCESS FOR MANUFACTURING ESTERS

Karl T. Steik, Montclair, N. J., assignor to Standard Oil Development Company, a corporation of Delaware Application April 14, 1937, Serial No. 136,775

6 Claims. (Cl. 260—495)

This invention relates to an improved process for manufacturing esters and more particularly it relates to the manufacture of esters directly from secondary alcohols as sole raw material and it is a continuation-in-part of co-pending application Serial No. 478,618 filed August 29, 1930, now Patent No. 2,086,582, which discloses and claims a method of manufacturing ketenes, such as acetic ketene ($CH_2:CO$) and its homologs, by subjecting organic compounds selected from the group consisting of alcohols and aldehydes and capable of producing ketenes by dehydrogenation and heat to progressively higher temperatures in stages without removing intermediate reaction products between stages.

The original application Serial No. 478,618 discloses the conversion of isopropyl alcohol or other alcohols directly into ketene or its homologs in a reactor having a low temperature zone (about 400° to 625° C.) to convert the isopropyl alcohol substantially completely into acetone, and a high temperature zone (625° to 850° C.) to convert some of the acetone into ketene, preferably using a cyclic process in which only about 5 to 20% conversion is obtained in the high temperature zone.

The original application illustrates suitable equipment and explains its use in detail for manufacturing ketenes. It also discloses that the ketenes formed by that process may be used for the preparation of esters by reacting the ketenes with a suitable hydroxy compound, such as an alcohol or cellulose, or may be used for making various other derivatives of the ketenes.

The original application also discloses that esters may be formed directly by reacting the ketenes with undecomposed alcohol passing through the conversion tubes and it is this particular feature which is the primary subject of the present invention.

The chemical reaction involved in this invention may be illustrated by the following equation:

(isopropyl alcohol)    (isopropyl acetate)

To form esters, such as isopropyl acetate, directly in the reactor, the time of heating of the vapors in the inlet or lower temperature portion and the outlet or higher temperature portion of the reactor is adjusted by varying either the effective diameter of the reactor or the feed rate of the vapors so that a substantial part of the alcohol goes unreacted through the inlet portion and reacts with nascent ketene formed by decomposition of some of the acetone produced in the inlet portion. A substantially shorter heating time in the inlet portion is used for making esters than for making ketenes for, as explained in the original application, when the process is operated for manufacturing ketenes the alcohol vapors are substantially completely decomposed into ketones in the inlet portion of the reactor and then preferably only a part of those ketones are converted into ketenes in the outlet portion of the reactor.

In this process it is preferable to employ in the inlet or lower temperature portion of the reactor a temperature of 600° to 800° C., and in the outlet or higher temperature portion of the reactor a temperature of 800° to 1000° C.

The time of heating also depends on temperature, the higher the temperature, the lower the time of contact. At 750°–900° C. the time of contact is usually below one second, say 0.02 to 0.2 sec. Below 750° C., say at 625° C., the time of heating may be in the neighborhood of several seconds. Very little ester is produced below 625° C.

The present invention will be fully understood from the following description read in connection with the accompanying drawing which is a diagrammatic view in elevation of suitable equipment for practicing the invention.

It will be assumed for facilitating the description that isopropyl acetate is to be made from isopropyl alcohol.

Referring to the drawing, reference numeral 1 denotes a long reactor or retort mounted on a support 2. The two ends of the reactor forming the two extremes of the reaction zone are designated 3 and 4. A pipe 5 conveys preheated isopropyl alcohol vapor into the lower temperature section 3 of the reactor. Anhydrous alcohol is used unless esters diluted with some water are suitable or are desired. Section 3 is packed with a dehydrogenating catalyst, preferably reduced copper, granular zinc oxide, or brass turnings. Air is substantially excluded. Heating means 6 are provided to maintain section 3 at about 400° to 625° C. The isopropyl alcohol may be preheated in a coil 7, if desired.

The reactor is heated in such a manner that the temperature of the gases and vapors therein is progressively increased, say from 400° to 625° C. at the inlet end to about 625° or 850° C. at the outlet end. The reaction tube should be of copper, brass, or similar metal, or it may consist of a steel tube lined with copper, brass, or the like. Decomposition of some of the isopropyl alcohol to acetone and hydrogen takes place in the inlet portion 3 of the reactor. The outlet portion of the reactor, where decomposition of some of the acetone to ketene and methane occurs and where the nascent ketene reacts with whatever undecomposed isopropyl alcohol is present, may be packed with quartz beads or the like. It is heated by any suitable means 8.

The pressure in the reaction zone may be substantially atmospheric but super-atmospheric or sub-atmospheric pressures are not precluded. The rate of flow is dependent on the temperature and the relative yield of esters desired in proportion to other possible reaction products such as acetone and ketene. With a medium rate of flow in the inlet portion of the reactor and a fast rate of flow through the outlet portion of the reactor, the products will comprise essentially acetone, isopropyl acetate, and some unconverted isopropyl alcohol, whereas with a medium rate of flow in the first portion and a slow rate of flow in the outlet portion, the products will comprise essentially acetone, isopropyl acetate and free ketene. It is possible to so adjust the rate of flow in the outlet portion at an intermediate rate properly co-ordinated with the rate of flow in the inlet portion so that the reaction products will comprise essentially only acetone and ester without having any substantial amount of either undecomposed alcohol or of free ketene.

It should be noted, of course, that if the feed rate is fast in the inlet portion resulting in very large amounts of isopropyl alcohol going into the second portion of the reactor, neither ester nor ketene will be formed at all unless a fairly slow rate of flow is used in the outlet portion of the reactor. It will also be understood that if the rate of flow in the inlet portion of the reactor is slow then the isopropyl alcohol will be substantially completely converted into acetone with the result that there will be no undecomposed alcohol present for nascent ketene to react with and consequently no ester will be formed. Finally, it should be noted that in practically all cases where there is any substantial amount of conversion at all in the outlet portion there will be some decomposition products formed, such as carbon monoxide and olefines, the amount of these being increased by high temperature and long time of contact.

The reaction products discharge through line 9 and may pass through cooler 9b into a cooled separator 10 maintained at a temperature above the boiling point of acetone (56° C.), but sufficiently low to condense isopropyl acetate (B. Pt. 90–93° C.), which may be discharged through line 10a. A temperature between the approximate limits of 56° and 85° C. is satisfactory. If the condensate from separator 10 contains any substantial amount of isopropyl alcohol, as may happen if an excessive feed rate is used, or if the temperature of the reactor is too low, this condensate, or at least a portion of it, may be recycled through line 11 into the isopropyl alcohol inlet line 5. Any alcohol present in the ester may be separated therefrom, as by fractionation, and also returned to inlet 5. The separator 10 may be of any suitable form, for example, a bubble cap tower or the like.

Unreacted acetone vapors together with ketene, if any is present, and/or vapors of the alcohol, if any are present and if the temperature of separator 10 is kept high enough to vaporize the alcohol (B. Pt. 82° C.), pass from separator 10 through line 12 into a second separator 13. This is held at a temperature at which acetone is condensed and preferably at which any ketene present woud pass over. Since ketene boils at about −56° C. and acetone at +56° C., a temperature separation is possible notwithstanding the solubility of ketene in acetone. Any ketene present along with gaseous decomposition products including hydrogen, methane, carbon monoxide and olefines, flows through line 14 to a recovery drum or tower 15, preferably containing bubble cap plates or the like and which has valved vapor and liquid draw-off lines 15a and 15b.

If desired, fresh isopropyl alcohol to be treated may be introduced into the top of the recovery drum 15 as a reflux medium. In such event, the liquid withdrawn from the bottom of the drum 15 will be treated to separate the isopropyl alcohol from the ketene in any conventional manner before passing the alcohol to the reactor 1.

Products flowing through line 15a may be discharged through a valved vent line 15c for use as fuel gas, or to a treating tank or tanks 15d. The product from this tank or tanks may be returned to the system through a line 15e (in which there is a vent 15f) to the isopropyl alcohol inlet line 5.

Drum 15 may be charged with cellulose suspended in acetic acid or other suitable liquid if it is desired to prepare cellulose acetate, with any free ketene which may be present in the gases issuing from separator 13, or the drum may be charged with anhydrous alcohols for the manufacture of esters, such as acetates, etc.

The liquid products, consisting chiefly of acetone discharged from separator 13, are preferably passed through line 16 back into the middle or outlet portion of the reactor. A preheater 17 may be provided in this line. If there is any undecomposed alcohol in these products, it may, if desired, be separated from the other constituents and sent through by-pass 16b (valve 16c being opened) into the lower temperature zone of the reactor.

Valves 5a, 9a, 10b, 11a, 11b, 12a, 14a, and 16a are provided in the lines bearing the corresponding numbers for the control of the system. The temperatures of the inlet and outlet portions of the reactor are determined by pyrometers 18 and 19.

If desired, instead of passing the hot reaction gases through the cooler 9b, they may be by-passed through line 20 into separator 10 and also, if desired, the gaseous products issuing from separator 10 may be by-passed through line 21 directly into line 14 leading into drum 15. This by-pass may be found useful in case it is desired to keep the temperature of separator 10 sufficiently low to condense out the acetone as well as the isopropyl acetate or in case it is desired to pass the acetone vapors directly over into the drum 15. In normal operation, however, by-pass 21 would not be used.

Provision for rapid cooling to check any tendency to after reaction may be provided by injecting into line 9, at its junction with line 20, which carries the reaction product, a cooling agent which may be a reactive liquid, such as isopropyl alcohol or water, or a non-reactive liquid, such as acetone, naphtha, etc. or the condensate formed from the reaction product, for instance, as recovered from drum 13. This line 20 discharges into separator 10. A line 22, in which there is a pump 23, withdraws liquid from the bottom of separator 13 and passes it through line 24 through cooling coil 25 into line 9 at its junction with line 20 and the mixed liquids from the two lines pass together into the tower 10. Suitable valves are provided and may be used to control the pressure. A float control mechanism may be provided in separator 13 to hold the desired liquid level. Surplus liquid may be discharged into line 16.

The condensate from separator 13 comprises essentially acetone with some dissolved ketene. By cooling coil 25, the temperature of separator 10 may be maintained at the desired point for condensing the isopropyl acetate but allowing the acetone vapors to pass over into separator 13.

Ordinarily, there are not enough olefines, such as propylene, present in the residual gases issuing from drum 15 to warrant recovery, but in the manufacture of esters from secondary alcohols higher than isopropyl alcohol, for example, secondary butyl alcohol, where the conversion of the alcohol in the initial stage is not as efficient as with isopropyl alcohol, it is desirable to recover the olefines formed in the second stage. These may be sulfated and hydrolyzed to re-form the alcohol for return to the system. Equipment for carrying this out is shown diagrammatically in the drawing (15a—d and e).

The particular form of the reactor shown is merely diagrammatic and any suitable type may be used. The waste gases may be burned to heat the reactors.

The invention includes the employment of ketenizable alcohols whether these are of the secondary type, ketenizing through the ketone (or enolic) route, or otherwise. It is found that operation under the conditions defined herein is practical and advantageous notwithstanding the presence of hydrogen or other reaction products resulting from the initial decomposition of the alcohol.

For the sake of illustration, the following experimental data are given:

*Example 1*

98% isopropyl alcohol was passed through a 1" quartz tube filled with 300 cc. of broken porcelain packing at about 775° to 980° C. and at a rate of 4–5.5 cc. of alcohol per minute. 1100 cc. of liquid product was condensed out of the reaction mixture, of which 5.7 cc. were isopropyl acetate. The time of heating in this case was about 0.12 sec.

*Example 2*

Dry isopropanol was passed through a copper tube of ¾" inside diameter, 30" length, the inlet portion of which was packed with brass chips and maintained at 800–820° C., while the outlet empty portion (26" length) was maintained at 940–970° C. The rate through the tube was about 8 cc. of alcohol per minute, which feed was vaporized prior to introduction into the reactor (time of heating being 0.038 sec.). The reaction product was condensed and collected. The yields (based on the inlet alcohol) were as follows: acetone 60.5%, ketene 6.1%, isopropyl acetate 2.4%, unreacted alcohol 11.6%, and carbon monoxide 3.8%.

*Example 3*

In an apparatus described in Example 2 with the inlet portion kept at 800° C., and the outlet portion at 950–970° C., dry isopropanol was fed in at a rate of 6.5 cc. per minute, the time of heating being 0.047 second. In this case, 7.3% of the alcohol was converted to isopropyl acetate, 7.3% to ketene, and 59% to acetone. About 9% was recovered as unconverted alcohol.

The above data show that, although a small amount of ester is produced by passing the isopropyl alcohol through a heated tube maintained at substantially the same temperature throughout its entire length as in Example 1, it is preferable to have the inlet portion of the reaction tube maintained at a lower temperature and the outlet portion at a higher temperature and to control the said rate in such a manner so that a substantial amount of isopropyl alcohol will go unconverted through the lower temperature zone of the reaction chamber and yet a substantial amount of the acetone which is formed in the lower temperature zone is ketenized in the higher temperature zone and a large portion of this ketenized acetone immediately reacts with unconverted acetate. It is of course apparent that the actual time of contact or exposure of the several vapors in the different zones of the reaction chamber will vary depending upon the actual temperatures used and the amount of conversion desired per pass in each zone. It is also apparent that substantially uniform temperature might be used through the entire reaction chamber by providing a suitable differential in the rate of flow in the gases through the inlet and outlet portion as by restricting the inlet portion to a small diameter in order to cause a raised flow, while using a larger diameter for the outlet portion in order to reduce the rate of flow and give a greater heat input and consequently greater ketenizing action.

By a comparison of Examples 2 and 3, it is observed that the faster feed rate of Example 2 (8 cc. of alcohol per minute) resulted in a greater proportion (11.6%) of the alcohol issuing unconverted from the reaction chamber and a lesser amount (2.4%) of isopropyl acetate being formed, whereas in Example 3, the slower feed rate (6.5 cc. per minute) resulted in a lesser amount (9%) of alcohol issuing unconverted from the reaction chamber and a greater amount (7.3%) of isopropyl acetate being formed.

Although the yield of isopropyl acetate, such as 7.3%, in Example 3, perhaps on first consideration does not appear very great, as a matter of fact, it does represent a substantially high yield, namely, about 50% of all of the alcohol which had been ketenized (only 7.3% issued as ketene). This is indeed surprisingly high and proves efficient by reason of the recycling of unconverted alcohol and acetone and the recovery of any unreacted ketene as previously explained.

The foregoing description is illustrative of preferred embodiments of the invention, but various changes and alternative arrangements may be made within the scope of the appended claims in which it is my intention to claim all novelty inherent in the invention as broadly as the prior art permits.

I claim:

1. The method of manufacturing esters which comprises subjecting a secondary alcohol to progressively higher temperatures in stages without removing intermediate reaction products between stages, the first stage of the treatment being conducted in the presence of a dehydrogenation catalyst and at such a temperature and for such a period of time that a portion only of the alcohol is converted in that stage to a ketone, while a remaining portion of the alcohol is unaffected in that stage.

2. The method of manufacturing esters which comprises subjecting a secondary alcohol to progressively higher temperatures in two stages without removing intermediate reaction products between stages, the first stage of the treatment being conducted in the presence of a dehydrogenation catalyst and at such a temperature and for such a period of time that a portion only of the alcohol is converted in that stage to a ketone, and the temperature and time of treatment in the second stage being so controlled that at least a portion of the ketone present is converted to a ketene and at least a portion of the ketene so formed immediately reacts with the unreacted alcohol present to form an ester.

3. The method of manufacturing esters which comprises subjecting a secondary alcohol to progressively higher temperatures in two stages without removing intermediate reaction products between stages, the first stage of treatment being conducted in the presence of a dehydrogenation catalyst and between the approximate temperature limits of 600 and 800° C., and the last stage between the approximate temperature limits of 800 and 1000° C., the temperature and time of treatment in the first stage being so controlled that a portion only of the alcohol is converted in that stage to a ketone, while a remaining portion of the alcohol is unaffected in that stage, and the second stage being conducted under conditions favoring the conversion of the ketone present into a ketene and the reaction of said ketene with the unconverted alcohol to form an ester.

4. The method of manufacturing isopropyl acetate which comprises subjecting isopropyl alcohol to progressively higher temperatures in two stages without removing intermediate reaction products between stages, the first stage of treatment being conducted in the presence of a dehydrogenation catalyst and between the approximate temperature limits of 600 and 800° C., and the last stage being conducted between the approximate temperature limits of 800 and 1000° C., the temperature and time of treatment in the first stage being so controlled that a portion only of the alcohol is converted in that stage to ketone, while a remaining portion of the alcohol is unaffected in that stage, and the second stage being conducted under conditions favoring the conversion of the ketone present into a ketene and the reaction of said ketene with the unconverted alcohol to form an ester.

5. The process of producing isopropyl acetate which comprises subjecting isopropyl alcohol to progressively higher temperatures between the approximate limits of 600° and 1000° C., in the presence of a dehydrogenation catalyst, without removing intermediate products, for such a time of contact that an amount of isopropyl acetate is produced which is at least substantially as great as the amount of ketene which is produced.

6. Process according to claim 5 in which the time of contact is maintained substantially shorter than that which is necessary to make a product consisting essentially of ketene and acetone, together with small amounts of gaseous decomposition products, such as hydrocarbons and carbon monoxide, and not more than a few per cent of unreacted alcohol, but substantially greater than that which is necessary to permit the unreacted alcohol issuing from the reaction chamber to be twice as great as the amount of ketene in the reaction products.

KARL T. STEIK.